(12) United States Patent
Suzuki

(10) Patent No.: US 7,110,845 B2
(45) Date of Patent: Sep. 19, 2006

(54) METHOD FOR MANAGING SEMICONDUCTOR MANUFACTURING EQUIPMENT AND SYSTEM FOR MANAGING SEMICONDUCTOR MANUFACTURING LINE

(75) Inventor: Koji Suzuki, Mihama-ku (JP)

(73) Assignee: Kawasaki Microelectronics, Inc., Mihama-ku (JP)

( * ) Notice: Subject to any disclaimer, the term of this patent is extended or adjusted under 35 U.S.C. 154(b) by 205 days.

(21) Appl. No.: 10/755,380

(22) Filed: Jan. 13, 2004

(65) Prior Publication Data

US 2004/0143353 A1   Jul. 22, 2004

(30) Foreign Application Priority Data

Jan. 15, 2003   (JP)   ............................. 2003-006740

(51) Int. Cl.
 *G06F 19/00*   (2006.01)
(52) U.S. Cl. ...................... 700/121; 700/101; 700/100; 438/905
(58) Field of Classification Search ................ 700/116, 700/100, 101, 121; 438/905; 134/56 R, 134/95.1
See application file for complete search history.

(56) References Cited

U.S. PATENT DOCUMENTS

| | | | |
|---|---|---|---|
| 6,136,211 A | | 10/2000 | Qian et al. |
| 6,544,345 B1 * | | 4/2003 | Mayer et al. .................. 134/28 |
| 6,645,303 B1 | | 11/2003 | Frankel et al. |
| 6,802,933 B1 * | | 10/2004 | Khan et al. ............ 156/345.26 |
| 6,814,814 B1 * | | 11/2004 | Collins et al. .................. 134/1 |
| 6,911,398 B1 * | | 6/2005 | Narita et al. ................ 438/706 |
| 2002/0155714 A1 | | 10/2002 | Suzuki |

FOREIGN PATENT DOCUMENTS

JP   A 11-214356   8/1999

* cited by examiner

*Primary Examiner*—Leo Picard
*Assistant Examiner*—Steven R. Garland
(74) *Attorney, Agent, or Firm*—Oliff & Berridge, PLC

(57) ABSTRACT

Manufacturing equipment performs different processes, including a first process that produces a reaction products and a second process that removes the reaction products, in a same chamber. The amount of reaction products in the chamber is monitored, and a priority order between the first and the second processes is set based on the monitored amount of the reaction products. The order of the first and the second processes is determined based on the set priority order. The amount of reaction products can be kept within an acceptable range without performing a long-period lot-to-lot cleaning, and a high manufacturing efficiency is realized.

18 Claims, 3 Drawing Sheets

METHOD FOR MANAGING SEMICONDUCTOR MANUFACTURING EQUIPMENT AND SYSTEM FOR MANAGING SEMICONDUCTOR MANUFACTURING LINE

BACKGROUND OF THE INVENTION

1. Field of Invention

This invention relates to a method for management of semiconductor manufacturing equipment, and particularly to a method for managing semiconductor manufacturing equipment that performs different processes. This invention also relates to a system for managing semiconductor manufacturing lines including manufacturing equipment.

2. Description of Related Art

Semiconductor devices are manufactured by processing semiconductor substrates (wafers), which are usually grouped in lots, in a manufacturing line. The manufacturing line includes a plurality of manufacturing equipments to perform a plurality of processes.

In conventional semiconductor manufacturing lines, dedicated manufacturing equipment is assigned for each process to prevent cross-contamination between different processes. For example, a gate etching process for forming gate electrodes, and an active etching step for forming LOCOS (Local Oxidation of Silicon) structures, are respectively performed by dedicated etching equipment.

During plasma processes such as plasma etching, reaction products are produced in the plasma and are deposited within the processing chamber of the apparatus. Because different processes utilize different process gases and different plasma conditions, amounts and chemical compositions of the reaction products vary depending on the process. By assigning dedicated equipment to each process, it is possible to fix the compositions and rate of deposition of the reaction products within the chamber. Thereby, for instance, wet cleaning using various kinds of solvents, and maintenance for replacement parts can be performed at a fixed interval, e.g., after processing of predetermined number of wafers.

Thus, assigning dedicated equipment for each process enables planned maintenance, and accordingly, is more effective. Unfortunately, however, operating rates of different equipment cannot be equalized.

For example, gate etching equipment for etching polysilicon films can continuously process 5,000 wafers or more without wet cleaning. On the other hand, a shallow trench etching equipment for etching silicon substrates with an etching gas containing a high flow rate HBr gas requires a wet cleaning upon processing of 3,000 wafers or less. This is because shallow trench etching produces a large amount of reaction products within the etching chamber.

The difference in operation rates has led to a problem of increased costs due to ineffective equipment investment and increased personnel load for maintenance. Consequently, various methods and equipment for reducing amount of reaction products within processing chambers of manufacturing equipment have been proposed so as to improve the manufacturing efficiency.

Japanese Unexamined Patent Application Publication No. JP-A-11-214356 (first reference) discloses a dry etching method for forming trenches in a silicon substrate. According to the etching method disclosed in the first reference, the trenches are formed using a silicon nitride film pattern as an etching mask by performing the following steps in a single etching chamber. At first, a natural oxide film formed on the surface of the silicon substrate, on which trenches are to be formed, is removed using a fluorine-based etching gas, and then a silicon etching using a chlorine- or bromine-based etching gas is performed, thereby forming trenches in the silicon substrate.

According to this first reference, continuously performing plasma etching with a fluorine-based etching gas and then with a chlorine- or bromine-based etching gas in a single etching chamber markedly reduces the amount of reaction products deposited on the inner wall of the chamber. Thereby, the process may be performed with excellent repeatability, and consequently, the frequency of dry cleaning may be reduced.

U.S. Pat. No. 6,136,211 (second reference) discloses a method of cleaning an etching chamber while a substrate is being etched, or a self-cleaning etching process. With this etching method, a process gas including etchant gas is used to etch the substrate thereby depositing etch residue inside the chamber. Cleaning gas is added to the process gas for a sufficient time and in a volumetric flow ratio that is sufficiently high, to react with and remove substantially all the etch residue deposited by the process gas.

The etching methods disclosed in these references are both aimed at reducing the amount of reaction products in the etching chamber during a single process. These references are not intended to perform different processes in the production of semiconductor devices within a single etching chamber. For example, in the method of the first reference, the etching of natural oxide film and the etching of silicon substrate are both performed within a single etching chamber. However, the etchings of these different materials are performed during a single process of trench formation.

In addition, etching conditions disclosed in these references, which are optimized to reduce the reaction products, are not always suitable for realizing desirable etching properties such as, for instance, high processing accuracy.

On the other hand, different processes are sometimes needed to be performed in a same etching chamber due to, for instance, shortage of manufacturing equipment. In this case, it has been thought that cleaning of the chamber is required between different processes in order to prevent contamination by the reaction products deposited in another process (cross-contamination). Obviously, necessity of such cleaning between different processes reduces the manufacturing efficiency. Therefore, the use of a single chamber for different processes is not considered to be efficient or desirable.

Even if the methods of reducing the amount of residues proposed in the first and the second references are used, it is difficult to completely eliminate the deposition of reaction products in the chamber. Furthermore, such methods of reducing residue are not applicable to all the processes involved in semiconductor device manufacturing. For example, the first reference proposes a combination of etching gases to reduce the amount of residue in trench etching process. However, the combination of the etching gases proposed in the first reference is not applicable to other processes.

Therefore, it is still necessary to clean the chamber between different processes, when different processes are performed in a single chamber.

SUMMARY OF THE INVENTION

As explained above, it has not considered efficient and desirable to perform different processes in the same chamber of a semiconductor manufacturing equipment. In various exemplary embodiments of this invention, it was discovered that performing different processes in the same chamber actually improves the manufacturing efficiency if the different processes are properly selected and combined.

Therefore, an object of this invention is to provide a method for managing semiconductor manufacturing equipment that performs different processes and is capable of realizing high manufacturing efficiency without reducing processing accuracy. Another object of this invention is to provide a system for managing semiconductor manufacturing line including manufacturing equipment that performs different processes.

In order to achieve the aforementioned object, according to various exemplary embodiments of this method, the method includes selecting a first process to be performed in a chamber of the manufacturing equipment, the first process producing reaction products in the chamber; selecting a second process to be performed in the chamber, the second process removing the reaction products in the chamber produced by the first process; monitoring an amount of the reaction products remaining in the chamber; and determining an order of the first and second processes based on the monitored amount of the reaction products.

Moreover, in order to achieve the aforementioned object, according to various exemplary embodiments of the systems and methods of this invention, a system for managing a semiconductor manufacturing line includes at least one semiconductor manufacturing equipment having a chamber, a host computer that manages the manufacturing line, and an individual management device that manages the manufacturing equipment. The manufacturing equipment performs a first process that produces reaction products in the chamber and a second process that removes the reaction product in the chamber produced by the first process and, optionally, performs a cleaning that removes the reaction products remaining within the chamber. The individual management device monitors an amount of the reaction products remaining in the chamber, sets a priority order between the first and the second processes based on the monitored amount of the reaction products, and notifies the host computer with the set priority order. The host computer determines an order of performing the first and the second processes based on the priority order notified from the individual management device.

In order to achieve the aforementioned object, according to various exemplary embodiments of the systems and methods of this invention, a semiconductor manufacturing equipment in a manufacturing line for processing a plurality of lots of wafers is managed. The line includes an individual management device that manages the manufacturing equipment and a host computer that controls the manufacturing line. The management method includes selecting a first and a second process to be performed in a chamber of a manufacturing equipment, the first process producing the reaction products in the chamber and the second process removing the reaction products in the chamber produced by the first process. The method also includes monitoring, in the individual management device, an amount of the reaction products remaining in the chamber, and setting a first priority order between the first and the second processes based on the monitored amount of the reaction products. The method finally includes selecting, in the host computer, a lot to be processed next by the manufacturing equipment from the plurality of lots based on the first priority order and a second priority order set in the host computer.

Thus, according to the method for managing semiconductor manufacturing equipment and the system for managing semiconductor manufacturing line of this invention, manufacturing capacity can be improved by performing different processes in a chamber, in an appropriate order, without reducing processing accuracy.

DETAILED DESCRIPTION OF PREFERRED EMBODIMENTS

This invention was first described in Japanese Patent Application No. 2003-6740, which is incorporated herein by reference in its entirety.

At first, problems of a comparative embodiment of a method in which a single etching chamber is used for performing different processes will be explained. In this comparative embodiment, cleaning of the etching chamber is performed between each process.

Figure 5:
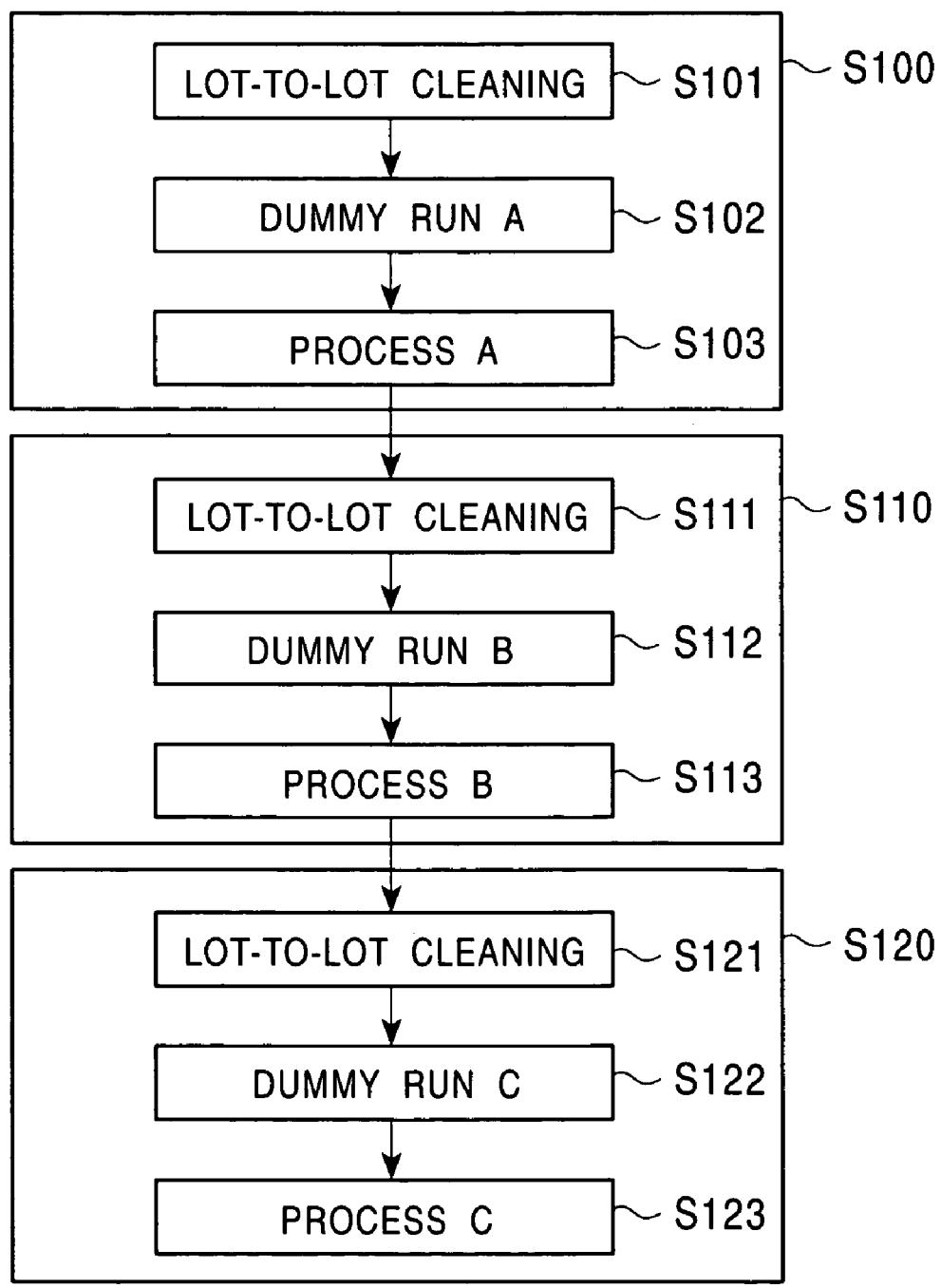
FIG. 5 is a flowchart illustrating a conventional method of performing different processes in a single chamber.

FIG. 5 shows a flowchart of a conventional method as a comparative embodiment wherein three different processes are performed in an etching chamber. As shown in FIG. 5, the method includes Step S100 for performing a first etching process, Step S110 for performing a second etching process, and Step S120 for performing a third etching process. Steps S100, S110 and S120 are performed successively in the same etching chamber. In each Step S100, S110, or S120, a plurality of wafers, for example, 24 wafers making up one lot, are processed.

Step S100 is a step for performing, for example, a gate etching process in which a polysilicon film, a silicide film, and/or the like is etched in order to form gate electrodes. Step S100 includes sub-steps S101, S102, and S103.

In step S100, first, a dummy wafer is placed in the etching chamber, and lot-to-lot cleaning is performed so as to clean the inside of the etching chamber (Step S101). In step S101, reaction products that were produced and that remain in the etching chamber during preceding processes are removed by a reaction with active species produced by plasma excitation of a cleaning gas including, for example, $SF_6$.

Next, a dummy run A (Step S102) is performed in order to condition the interior atmosphere of the etching chamber so as to conduct process A (gate etching). Another dummy wafer is placed in the chamber for the dummy run A.

Next, in step S103, one lot of silicon wafers, each having a polysiline silicon and/or a silicide film for forming the gate electrode and a mask layer, are placed within the etching chamber one by one, and are subjected to process A (gate etching) under a predetermined condition (Step S103).

During step S103, the films on the wafers are etched by the active species produced by the plasma excitation of a process gas. At the same time, however, reaction products are produced in the plasma, and deposit in the etching chamber.

Similarly, Step S110 includes sub-steps S111, S112, and S113, and Step S120 includes sub-steps S121, S122, and S123.

In Step S110, the dummy run A and the process A are replaced with a dummy run B (Step S112) and process B (Step S113), respectively. In Step S120, the dummy run A and the process A are replaced with a dummy run C (Step S122) and process C (Step S123), respectively. The sub-steps of steps S110 and S120 are similar to those of Step S100, so the detailed descriptions thereof are omitted.

Here, process B is the etching of a silicon nitride film for formation of a LOCOS structure, and process C is a light etching for removing a damaged layer at the bottom of a contact hole.

As described above, in the method shown in FIG. 5, each of the steps S100, S110, and S120 includes the lot-to-lot cleaning sub-step (S101, S111, and S121, respectively) and the dummy run sub-step (S102, S112, and S122, respectively) prior to the sub-steps (S103, S113, and S123, respectively) for actually etching wafers for the manufacturing of semiconductor devices.

The lot-to-lot cleaning in each step is aimed at preventing cross-contamination between different processes by removing reaction products produced and deposited in the chamber during a previously performed process.

In the example shown in FIG. 5, Steps A, B, and C are respectively performed in that order. In reality, however, these steps are not necessarily conducted in such a fixed order. That is, a host computer controlling the manufacturing line arranges the steps in varying orders according to a manufacturing state from one time to another. Accordingly, not only the number but also the order of conducting steps A, B, and C may vary from one time to another.

In the determination of the order of these steps by the host computer, the previously performed process is not taken into consideration. Accordingly, the condition of the lot-to-lot cleaning in each step is set so as to prevent or reduce cross-contamination between steps from occurring regardless of the number and order of different processes performed within the single etching chamber.

That is, a sufficiently long period is set for each of the lot-to-lot cleaning steps S101, S111, and S121 so as to sufficiently remove reaction products and prevent or reduce cross-contamination even if the preceding process is the process that produces the largest amount of reaction products in the chamber. Thus, the period of lot-to-lot cleaning increases, and the processing efficiency decreases.

For example, if one lot is formed of 24 wafers, the processing period per lot is 1 to 2 hours. On the other hand, the period of lot-to-lot cleaning is 5 to 10 minutes using one dummy wafer. Moreover, the dummy run period is 1 to 2 minutes using one dummy wafer. Therefore, the periods required for the lot-to-lot cleaning and the dummy run is 6 to 12 minutes, which is equivalent to around 10% of the processing period per lot. Accordingly, the longer the lot-to-lot cleaning period is, the lower the manufacturing efficiency is.

Further, even if the lot-to-lot cleaning is performed for such a long period of time, reaction products within the etching chamber cannot always be completely removed. Consequently, a portion of the reaction products may remain inside the etching chamber. When the amount of the remaining reaction products exceeds a critical value, the reaction products produce particles or drops inside the etching chamber, thereby reducing the yield of production. In order to solve this problem, wet cleaning should also be performed, using various kinds of solvents.

When performing wet cleaning, the inside of the etching chamber is exposed to the ambient atmosphere. Therefore, moisture from the ambient atmosphere adheres to the inside of the etching chamber. It generally takes an extremely long waiting period (down time), e.g., about 10 to 12 hours, to remove the adhered moisture before re-starting processing of product wafers.

Accordingly, it is necessary to reduce the frequency of wet cleaning as much as possible in order to improve the productivity of the process. In other words, a number of wafers that can be processed between wet cleanings, which is called "MWBC" (Mean Wafers Between Cleaning), can be used as an indicator of the productivity. The greater the MWBC is, the higher the manufacturing efficiency is.

Extending the lot-to-lot cleaning period is considered to be effective to extend the MWBC by reducing the amount of reaction products remained in the chamber. In reality, however, the reaction products in the chamber cannot always be completely removed even if the cleaning period is extended for a significant period of time, because the plasma used for cleaning cannot always reach some areas inside the chamber. Moreover, excessively extending the cleaning period may severely damage parts inside the etching chamber, and accordingly may actually reduce the MWBC.

Preferred embodiments of methods for managing semiconductor manufacturing equipment and systems for managing semiconductor manufacturing lines according to this invention will be explained in detail, with reference to attached drawings.

According to various exemplary embodiments, combined processing of different processes in an appropriate order, inside a single etching chamber, reduces the amount of reaction products, as compared to the continuous processing of a single process within the chamber. That is, conducting different processes while using the same equipment may decrease the amount of reaction products in the chamber compared with a situation where dedicated equipment is assigned for each process.

The decrease in the amount of reaction products achieved by combining different processes in a single chamber will be explained with reference to FIG. 1.

Figure 1:
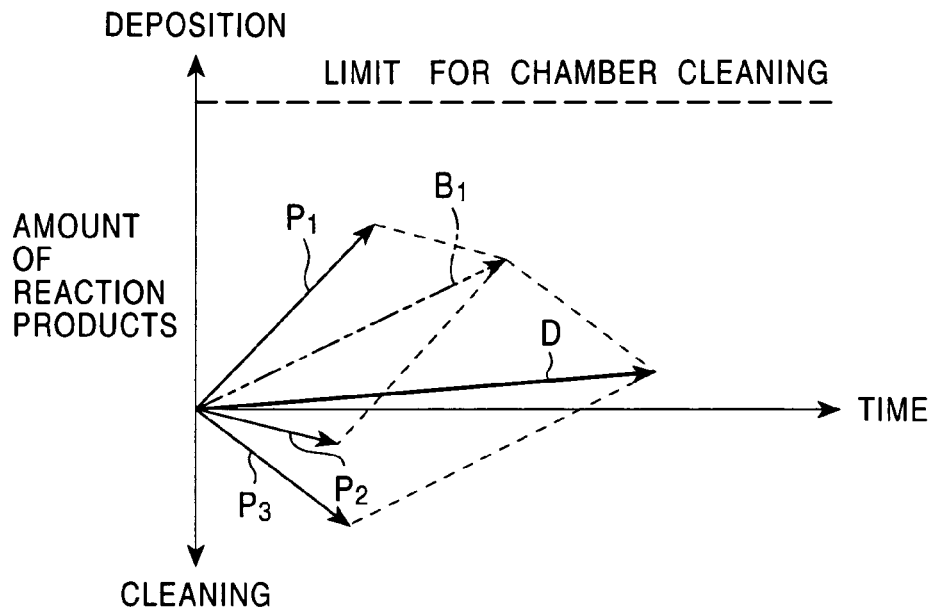
FIG. 1 illustrates the state of deposition/removal of reaction products in an etching chamber, in which different processes are performed.

FIG. 1 is a chart illustrating a change in the amount of reaction products inside an etching chamber in which three different processes are performed. The vertical axis shows the amount of reaction products. The horizontal axis shows the processing time. The broken line represents a limit corresponding to chamber cleaning. That is, if the amount of reaction products exceeds this level, the chamber should be cleaned in order to prevent or reduce generation of particles.

Here, three different processes, for example, gate etching for patterning a polysilicon film ($P_1$ in FIG. 1) employing a $Cl_2$—$HBr$—$O_2$ process gas, light etching ($P_2$ in FIG. 1) for removing a damaged layer at the bottom of a contact hole employing an oxygen-rich $CF_4$—$O_2$—$Ar$ process gas, and active etching ($P_3$ in FIG. 1) for patterning a silicon nitride film employing a fluorine-rich $SF_6$—$HBr$—$O_2$ process gas, are performed in a single chamber.

According to various embodiments, during the gate etching process, reaction products containing Si are produced and deposited within the etching chamber. Consequently, the amount of reaction products increases as shown by the arrow $P_1$. Next, during the light etching process under an oxygen-rich atmosphere, the reaction products remaining at the end of the gate etching process are partially removed by oxidation (Si→SiO, $SiO_2$) and etching ($SiO_2+CF_2$→$SiF_4+CO_2$). Consequently, the amount of reaction products decreases and the chamber is cleaned to some extent, as shown by the arrow $P_2$. Furthermore, during the active etching process under a fluorine-rich process gas, the amount of reaction products further decreases, and the chamber is further cleaned, due to self-cleaning effects ($Si+F \rightarrow SiF_4$, $SiO_2+SF_6 \rightarrow SiF_4+SO+OF_2$), as shown by the arrow $P_3$.

In FIG. 1, changes in the amount of reaction products during each process are represented with vectors $P_1$, $P_2$, and $P_3$, for the gate etching, for the light etching, and for the active etching, respectively. By combining the vector P1 and P2, a vector B1 is produced. The vector B1 is further combined with the vector P3 to produce the vector D.

Vector D clearly indicates that the amount of reaction products markedly decreases when combining the three different processes compared with the case where only the gate etching process is continuously performed in the chamber.

Thus, performing different processes within the same chamber effectively reduces the amount of reaction products remaining inside the chamber. Thereby, the wet cleaning cycle (MWBC) of the etching chamber can be extended.

However, processing lots instructed by a host computer according to the manufacturing state does not necessarily result in the reduction of reaction products simply because of the combination of such different processes.

For example, continuously performing only the gate etching processes, which produces reaction products, results in the increase of the reaction products beyond a critical permissible range, such as, for instance, the limit for chamber cleaning shown in FIG. 1. A wet cleaning then becomes necessary. Conversely, the cleaning effect on the reaction products of the light etching and active etching processes cannot be effectively utilized if these processes are continuously performed when the amount of the reaction products in the chamber is small.

Accordingly, the different processes are required to be performed in an appropriate order to take advantage of the cleaning effect of some of these processes.

The simplest way to take advantage of the cleaning effect of some of the processes is to fix the order of the processes. For example, after the amount of reaction products in the chamber is increased by performing one lot of gate etching, the light etching and active etching processes are performed for one lot, respectively, thereby cleaning the chamber. Thus, the amount of reaction products in the etching chamber can be consistently suppressed to a small level.

To realize such fixed order processing, following a lot of gate etching, it is necessary to request the host computer to supply a lot for light etching and a lot for active etching.

In reality, however, it is not always possible to select a lot for light etching or active etching even when these processes are preferably performed to clean the chamber. For example, there might be cases where such desired lots are not waiting for processing at that time. In other cases, it may be necessary to process a lot for gate etching before a lot for light etching or active etching even when the amount of reaction products is increased.

Thus, the rule of fixing the order of processes cannot easily be applied to a real manufacturing line. Accordingly, a rule flexibly applicable for real manufacturing lines, which does not fix the order of the processes, is required.

In various exemplary embodiments of the systems and methods for managing semiconductor manufacturing equipment according to this invention, the order of the processes to be performed is not fixed. Rather, the amount of reaction products in the etching chamber is monitored, and accordingly, the priority of processes is set based on this monitored amount.

When the monitored amount of reaction products is small, i.e., within a permissible range below an upper limit, a process that produces and deposits reaction products such as gate etching may be performed, regardless of the previously performed process. When the monitored amount approaches to the upper limit, on the other hand, a priority is given to the process having a cleaning effect, such as active etching. Even in that case, however, the order of the processes is not determined with this priority alone. For example, a process that deposits reaction products, such as gate etching, is sometimes performed prior to processes having a cleaning effect depending on other factors.

It is to be noted that FIG. 1 shows a case where three different processes are continuously being performed without performing any lot-to-lot cleaning between each process. That is, the combined vector D shown in FIG. 1 represents a case where, in FIG. 5, the lot-to-lot cleaning S101, S111, and S121 are not performed, and the dummy run A (S102), process A (S103), dummy run B (S112), process B (S113), dummy run C (S122), and process C (S123) are consecutively performed in that order.

According to various exemplary embodiments, in order to improve manufacturing efficiency, as described above, it is ideal that the lot-to-lot cleaning is not performed at all. However, there are some cases wherein the lot-to-lot cleaning is preferably performed to prevent or reduce cross-contamination depending on the successively performed processes.

Even in the case where the lot-to-lot cleaning is performed, the time period for the cleaning is preferably reduced. That is, the cleaning time is reduced to a level that is effective for preventing or sufficiently reducing cross-contamination, but not sufficient to remove all the reaction products remaining at the end of a process that produces reaction products, such as gate etching.

Reducing the lot-to-lot cleaning period improves manufacturing efficiency compared to the case shown in FIG. 5 where the lot-to-lot cleaning period is set such that the reaction products can be sufficiently removed even when the preceding process produces the largest amount of reaction products.

Moreover, in various exemplary embodiments, there may be cases where, among the lots that should be processed by a particular equipment, the number of lots that requires processing that produces reaction products is greater than the number of lots that requires processing that removes the reaction products. In such case, even if the order of performing the processes is controlled, it is difficult to keep the amount of reaction products within a permissible range.

In such a case, in addition to performing the different processes in an appropriate order, performing lot-to-lot cleanings with appropriate periods makes it possible to keep the amount of reaction products within a permissible range.

Furthermore, according to various exemplary embodiments, it is also possible to utilize the lot-to-lot cleaning only when it becomes necessary. That is, during the normal operation, the amount of reaction products in the chamber is suppressed without any lot-to-lot cleaning, simply by utilizing the cleaning effects of the light etching and active etching processes to remove the reaction products. Then, only when it becomes impossible to keep the amount of reaction products within a permissible range, lot-to-lot cleaning is performed.

According to various exemplary embodiments, it is also possible to perform a short-period lot-to-lot cleaning during the normal operation, while also utilizing the cleaning effects of light etching and active etching processes. In the event that it becomes impossible to keep the amount of reaction products within a permissible range, an additional lot-to-lot cleaning is further performed in addition to the normal short period lot-to-lot cleaning. Alternatively, according to various exemplary embodiments, the combination of the normal short period lot-to-lot cleaning and the additional lot-to-lot cleaning may be replaced with a longer-period lot-to-lot cleaning.

According to various exemplary embodiments of the systems and methods for managing operation of semiconductor manufacturing equipment according to this invention, the priority of processes is set based on the amount of reaction products in the chamber, then the order of the processes to be performed is determined based on the set priority. However, the order of processes cannot always be determined only by the priority based on the amount of reaction products.

In the actual manufacturing line, priorities based on other factors should also be considered to determine the order. For example, the order may be determined based on the number of lots waiting to be processed, and/or other factors. The determined order may be inconsistent with the priority set in order to reduce the amount of reaction products. In such a case, in order to prevent the amount of reaction products from exceeding the permissible range, additional lot-to-lot cleaning is performed.

As described above, according to various exemplary embodiments of the methods of this invention, different processes with different deposition/cleaning effects on the reaction products are combined in an appropriate order. With such combined processing, the wet cleaning cycle can be extended without constantly performing long-period lot-to-lot cleaning. Thereby, the manufacturing efficiency of semiconductor devices can be improved.

Figure 2:
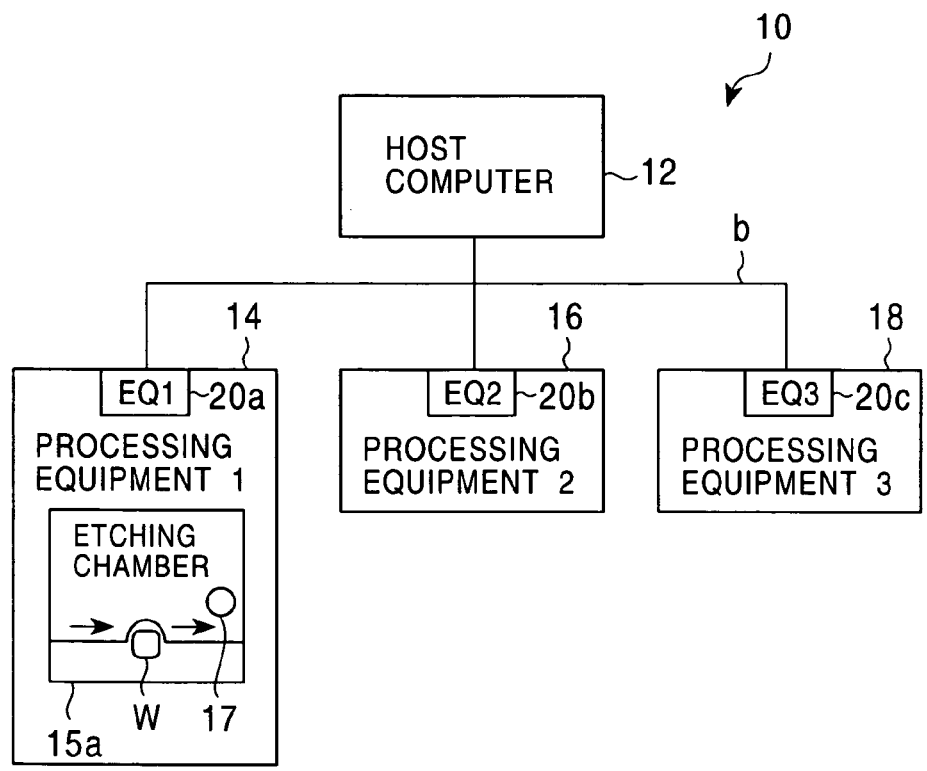
FIG. 2 is a block diagram illustrating a management system for a semiconductor manufacturing line according to a first embodiment of this invention.

The following is a description of a first exemplary embodiment according to this invention. FIG. 2 is a block diagram illustrating a management system for a semiconductor manufacturing line according to the first embodiment of this invention.

As shown in FIG. 2, the management system for semiconductor manufacturing line 10 includes a host computer (host management device) 12, a plurality of manufacturing equipment 14, 16, and 18 (first through third plasma processing equipment), transporting devices (not shown) such as AGVs (Automated Guided Vehicles) or RGVs (Rail Guided Vehicles) for transporting lots of wafers W to respective manufacturing equipment 14, 16, and 18. The manufacturing equipment 14, 16, and 18 are connected to the host computer 12 via a bus b. Thereby, a communication network is formed.

The host computer 12 is, similar to a host computer in a conventional management system, a computer for controlling the entire semiconductor manufacturing line 10. The host computer 12 monitors the operations of the manufacturing equipment 14, 16, and 18, and instructs them to perform the next processes. The host computer 12 also instructs the transporting devices to transport wafers W to be processed to the equipment 14, 16, and 18.

The host computer manages the priority of processes based on various factors including one or more of: delivery dates of products, operating status of the manufacturing equipment, and the like. Meanwhile, individual management devices 20a, 20b, and 20c provided in the manufacturing equipment 14, 16, and 18 manage the priority of processes for their respective equipment.

The host computer 12 compares the priority of processes transmitted from the individual management device 20a (20b, 20c) with the overall priority of the manufacturing line as described in more detail below. If it is permissible, the host computer 12 selects the lot to be processed based on the priority of the individual management device 20a (20b, 20c) and instructs the manufacturing equipment 14 (16, 18), and the transporting devices.

The manufacturing equipment 14, 16, and 18 perform plasma processes such as etching of the wafers W in the lots received from the transporting device. Manufacturing equipment 14 includes an etching chamber 15a for etching wafers W, an end-point-detection device (not shown) for determining the completion of the etching, and an individual management device 20a. The etching chamber 15a may include an observation window 17 formed of quartz glass or the like for monitoring the inside of the etching chamber 15a.

Similarly, the manufacturing equipment 16 and 18 include individual management devices 20b and 20c, respectively. Although omitted in FIG. 2, the manufacturing equipment 16 and 18 also include etching chambers and end-point-detection devices.

The manufacturing equipment 14, 16, and 18 may be various types of plasma equipment, such as magnetron RIE equipment, ECR plasma etching equipment, Helicon-wave plasma etching equipment, and induction-coupled plasma etching equipment.

Figure 3:
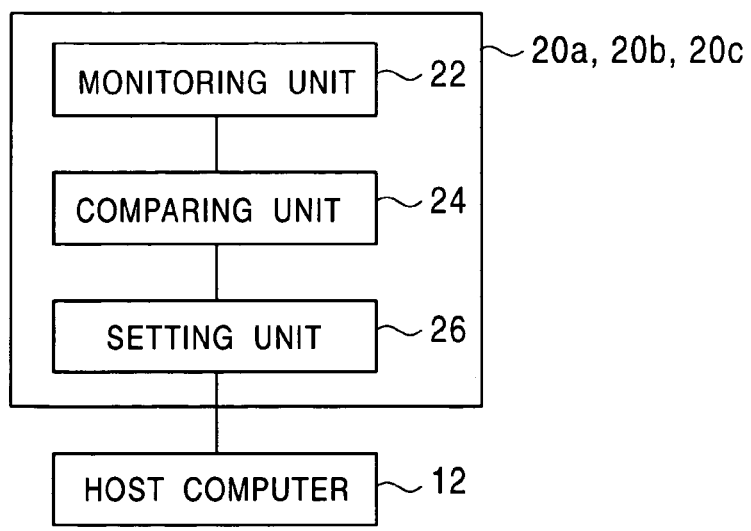
FIG. 3 is a block diagram illustrating the configuration of the individual management device.

Next, the individual management device 20a (20b, 20c) is explained with reference to FIG. 3. FIG. 3 is a block diagram illustrating an exemplary configuration of the individual management device 20a (20b, 20c). As shown in FIG. 3, the individual management device 20a (20b, 20c) includes a monitoring unit 22, a comparing unit 24, and a setting unit 26.

The monitoring unit 22 is a unit for monitoring the amount of reaction products within the etching chamber 15a of the manufacturing equipment 14 (16, 18). Monitoring of the amount of reaction products may be performed based on measurement results received from a measuring device installed in the etching chamber 15a. Alternatively, the monitoring may be performed based on a record of the etching processes and cleanings of the equipment that have been performed and that is stored in the individual management device 20a (20b, 20c).

The comparing unit 24 compares the amount of reaction products monitored by the monitoring unit 22 with a predetermined reference value.

The setting unit 26 may set a priority order of the processes based on the result of comparison by the comparison unit 24. The priority order is set, at least to the process to be performed next, such that the amount of reaction products in the chamber 15a can be suppressed to equal to or less than the reference value. Further, in various exemplary embodiments, the setting unit 26 notifies the host computer 12 of the set priority.

The individual management device 20a (20b, 20c) may also, in addition to monitoring the current amount of reaction products in the chamber by utilizing the monitoring unit, estimate the amount of reaction products in the chamber in the future, e.g., after processing the next lot instructed by the host computer. If the individual management device 20a (20b, 20c) finds that the amount of reaction products will exceed the reference value despite the setting of the priority order by the setting unit 26, the individual management device 20a (20b, 20c) preferably instructs the manufacturing equipment 14 (16, 18) to perform an additional lot-to-lot cleaning.

Next, an exemplary method of monitoring the amount of reaction products in the chamber 15a is described.

Figure 4:
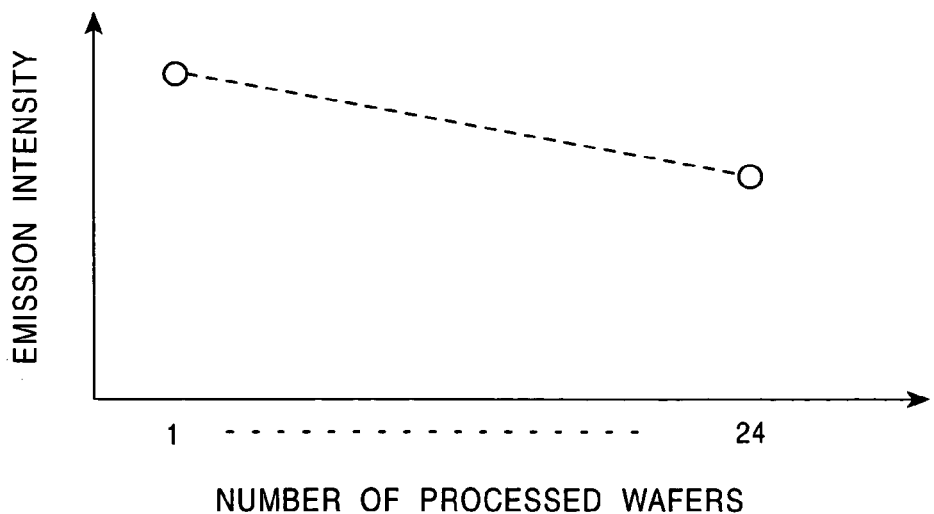
FIG. 4 is a chart schematically illustrating the decrease of emission intensity with respect to an increase in the number of processed wafers.

FIG. 4 is a chart schematically illustrating the decrease of emission intensity in proportion to an increase in the number of wafers being processed by, e.g., gate etching which produces reaction products in the chamber. The vertical axis represents the emission intensity from etched products released from the wafer into the plasma, which is measured via the observation window 17 (see FIG. 2). The horizontal axis represents the number of processed wafers. The first wafer is processed immediately following a lot-to-lot cleaning of a sufficiently long period.

As shown in FIG. 4, the greater the number of wafers processed, the lower the emission intensity. The decrease of emission intensity is due to the decrease in the transmittance of the window 17 by the reaction products that are deposited on the window 17. Thus, obtaining a correlation between the decrease of emission intensity and the amount of reaction products within the chamber enables monitoring of the amount of reaction products by a measurement of the emission intensity.

It is to be noted that the measurement method for monitoring the amount of reaction products is not limited to the above-described method. For example, the amount of reaction products may be monitored by emission spectrum analysis of the plasma within the chamber 15*a*, by measurement of transmittance of the window 17 by introducing an external light, or the like.

FIG. 2 shows a case where the individual management devices 20*a*, 20*b*, and 20*c* are disposed within the respective manufacturing equipment 14, 16, and 18. Thus, for example, a worker for performing maintenance of the respective equipment 14, 16, and 18 offline can readily confirm any records of processing and make adjustments.

However, the positions where the individual management devices 20*a*, 20*b*, and 20*c* are disposed are not limited to the ones shown in FIG. 2. For example, the individual management devices 20*a*, 20*b*, and 20*c* may be disposed inside the host computer 12, thereby permitting a centralized control. Moreover, lower level computers, each managing a group of manufacturing equipment and controlled by the host computer 12 through the communication network, may be additionally disposed in the management system 10, and the individual management devices 20*a*, 20*b*, and 20*c* may be disposed within the lower level computers.

With the management system 10 for semiconductor manufacturing lines according to this embodiment, the setting unit 26 of the individual management device 20*a* (20*b*, 20*c*) sets a priority order at least for the process to be performed next such that the amount of reaction products can be maintained within the critical value. Also, in various exemplary embodiments, the individual management device 20*a* (20*b*, 20*c*) notifies the host computer 12 of the set priority order. Subsequently, considering the priority orders received from the individual management devices 20*a*, 20*b* and 20*c*, priority orders set and managed within the host computer, and the number and statuses of the lots waiting to be processed, the host computer 12 selects the lots to be processed by the equipment 14, 16, and 18.

Specifically, when it is possible to select the lot to be processed next based on the priority order notified from the individual management device 20*a* (20*b*, 20*c*) of the manufacturing equipment 14 (16, 18), the host computer 12 selects the lot based on the notified priority order, and instructs the manufacturing equipment 14 (16, 18) to process the selected lot. Thus, the amount of reaction products can be suppressed to the reference value or less.

On the other hand, if it is impossible for the host computer 12 to select the lot to be processed next based on the priority order notified from the processing equipment 14 (16, 18), the host computer 12 selects the lot to be processed next based on the priority orders set and managed by the host computer 12, and instructs the manufacturing equipment 14 (16, 18) to process the selected lot. If it is predicted that the amount of reaction products will exceed the reference value by the processing of the lot instructed by the host computer 12, the setting unit 26 of the individual management device 20*a* (20*b*, 20*c*) instructs the manufacturing equipment 14 (16, 18) to perform an additional lot-to-lot cleaning.

As described above, with the management system 10 for a semiconductor manufacturing line according to this embodiment, the monitoring unit 22 of the individual management device 20*a* (20*b*, 20*c*) monitors the amount of reaction products in the etching chamber 15*a*, and then the setting unit 26 sets a priority order to a process to be performed next based on the monitored amount of reaction products. The individual management device 20*a* (20*b*, 20*c*) notifies the host computer 12 of the set priority order, and then the host computer 12 selects a lot to be processed next based on the notified priority order. Thereby, appropriate ordering of the processes performed by the manufacturing equipment 14 (16, 18) can be realized.

Thus, the amount of reaction products in the etching chamber 15*a* can be maintained within the reference value. Moreover, if the lot to be processed next cannot be selected based on the priority order set by the setting unit 26 due to manufacturing status or the like, and if it is predicted that the amount of reaction products exceeds the reference value, a lot-to-lot cleaning is added before the processing of the lot selected by the host computer 12. Even in this case, the period of the lot-to-lot cleaning can be decreased to a minimal level as compared with the case shown in FIG. 5, thereby keeping the overall operating rate high.

A method of managing semiconductor manufacturing equipment using the management system according to this invention is described below.

In the management method according to various exemplary embodiments of this invention, deposition/cleaning effects of various processes are evaluated by measuring remaining amounts of reaction products. The following five different etching processes have been evaluated.

(1) Gate Etching

A polysilicon film 34, a tungsten silicide (WSi) film, and a bottom anti-reflective coating film (hereafter, referred to as BARC) are layered in order on a silicon oxide film on the surface of a silicon substrate. These layered films are each etched successively in a same etching chamber using different etching gases using a resist pattern as a mask. Thereby, gate electrodes are formed.

This series of etchings of layered films is considered a single etching process, namely, a gate etching process. However, the amount of reaction products remaining on the wafer is measured and the deposition/cleaning effect is evaluated for the etching of each layer. In addition, deposition/cleaning effect of the entire gate etching process is also evaluated by measuring the reaction products remaining on the wafer after the completion of the etching of the layered films.

(2) Light Etching

Etching is performed with a hydrocarbon-based process gas to remove a damaged layer on the surface of a silicon substrate generated during the contact etching. The cleaning effect is evaluated by measuring the reduction in the amount of reaction products on a wafer.

(3) Active Etching

A silicon nitride film formed on the surface of a silicon substrate is etched with a resist mask. The patterned silicon nitride film is used as an oxidation-resistant film for the LOCOS (Local Oxidation of Silicon) process. The amount of reaction products is measured after the silicon nitride film etching is completed so as to evaluate the cleaning effect.

(4) STI Etching

Using a resist mask, first, a BARC layer, and next a silicon nitride/silicon oxide layered film, are each etched with different process gases. Furthermore, the exposed region on the surface of the silicon substrate is etched with another different process gas so as to form a trench. These three etching steps are performed successively in the same etching chamber. The trench thus formed is used to form a field isolation region by the STI (Shallow Trench Isolation) process.

The series of etching steps with different process gases successively performed in the same etching chamber are considered one etching process, as is the case with the gate etching. The amount of reaction products is measured so as to evaluate the deposition/cleaning effects of each etching step and of the total process.

(5) SiN Sidewall Etching

In order to form an LDD (Lightly Doped Drain) structure, a silicon nitride film formed on the top and side surfaces of a patterned gate electrode is subjected to anisotropic etching to form a sidewall. The amount of reaction products is measured so as to evaluate the cleaning effect.

Table 1 shows the above-evaluated results regarding deposition/cleaning effects of the different processes, as well as the process gases employed. As shown in Table 1, cleaning effect of the lot-to-lot cleaning is also included in the evaluated result.

of the manufacturing equipment 14 (16, 18). These stored results are used at the time of monitoring the amount of reaction products based on the process record. Also, these results can be used when the setting unit 26 sets the priority order.

The following is a description regarding the management method according to this embodiment. In the management method, with the individual management device 20a (20b, 20c) and the host computer 12, a priority order of the processes is set, and an order of the process is determined based on this set priority order.

A first process that produces and deposits reaction products within the etching chamber 15a, and a second process that removes the reaction products produced during the first process, are selected. The amount of reaction products remained within the etching chamber 15a is monitored, and the order of the first and second processes is set based on the monitored amount.

In various exemplary embodiments, the first process is an etching process using a process gas including at least one of chlorine and bromine, such as gate etching.

The second process includes light etching, active etching, and SiN sidewall etching, for example. In various exemplary embodiments, etching using a process gas including $SF_6$ gas is preferable. In various exemplary embodiments, active etching and SiN sidewall etching, of which cleaning effects are shown in Table 1, are also preferable. Either of these processes is an etching process for a silicon nitride film.

In order to determine the order of the above selected processes, the comparing unit 24 of the individual management device 20a (20b, 20c), compares the monitored amount of reaction products with a reference value. Subsequently, the setting unit 26 of the individual management device 20a

TABLE 1

| PROCESS | OBJECT | PROCESS GAS | CLEANING EFFECT | |
|---|---|---|---|---|
| LIGHT ETCHING | REMOVAL OF DAMAGED LAYER | $CF_4$—$O_2$, or $CF_4$—$O_2$—Ar | B | |
| ACTIVE ETCHING | LOCOS | $SF_6$, or $SF_6$—HBr, or $SF_6$—HBr—$O_2$—Ar | A | |
| SiN SIDEWALL ETCHING | LDD FORMATION | $SF_6$, $SF_6$—HBr, or $SF_6$—HBr—$O_2$—Ar | A | |
| STI ETCHING | TRENCH FORMATION | (ORGANIC BARC) $Cl_2$—$O_2$, or HBr—$O_2$ | C | D |
| | | (SiN + $SiO_2$) $CF_4$—Ar, or $CF_4$—$O_2$—Ar | C | |
| | | (Si) HBr—$O_2$, or $Cl_2$—$O_2$ | D | |
| GATE ETCHING | GATE ELECTRODE FORMATION | (ORGANIC BARC) $Cl_2$—$O_2$, or HBr—$O_2$ | C | C |
| | | (WSi) $Cl_2$—$O_2$, or $CF_4$—$Cl_2$—$O_2$ | C | |
| | | (POLY Si) $Cl_2$—HBr—$O_2$ | C | |
| | | (OVER ETCHING) HBr—$O_2$ | D | |
| LOT-TO-LOT CLEANING | PLASMA CLEANING | $SF_6$ | A | |

In the column of cleaning effect in Table 1, the label A represents a high cleaning effect (a high removal effect) on the reaction products, the label B represents a low cleaning effect (a low removal effect) on the reaction products, the label C represents a small deposition effect (a small production effect) on the reaction products, and the label D represents a high deposition effect (high production effect) on the reaction products.

These results are stored in, for example, the monitoring unit 22 of the individual management device 20a (20b, 20c)

(20b, 20c) sets a priority order between the first and second processes based on the result of the comparison.

For example, if the monitored amount of reaction products approaches the upper limit within the permissible range where particles are not generated, the setting is such that the second process that removes the reaction products is given the priority over the first process that produces and deposits the reaction products. Subsequently, the set priority order is notified to the host computer 12.

On the other hand, priority orders based on, for example, delivery dates of products and/or various other factors are set in the host computer 12. The host computer 12 takes not only the priority order notified from the individual management device 20a (20b, 20c) but also the priority orders set in the host computer 12 into consideration.

The host computer 12 selects a lot to be processed next based on the priority order notified from the setting unit 26, if such selection is permissible considering the priority order set in the host computer 12. That is, the host computer 12 selects, among the lots in waiting status, a lot that matches the priority order notified from the setting unit 26. Then, the host computer 12 transmits an instruction for performing the process of the selected lot to the equipment 14 (16, 18).

In some cases, however, there may be no lot, among the lots in waiting status, that match the priority order notified by the individual management device 20a (20b, 20c). Moreover, in some other cases, the priority order set by the host computer 12 may prohibit the selection based on the priority order set by the individual management device 20a (20b, 20c). That is, the priority order notified by the individual management device may be inconsistent with higher portions of the priority order set by the host computer.

In such cases, the selection of the lot to be processed next by the host computer 12 is inconsistent with the priority order set by the individual management device 20a (20b, 20c). If such a selected lot is actually processed next by the manufacturing equipment 14 (16, 18), the amount of reaction products in the chamber may exceed the reference value.

If it is predicted that the amount of reaction products will exceed the reference value, the individual management device 20a (20b, 20c) transmits instruction to the manufacturing equipment 14 (16, 18) to perform an additional lot-to-lot cleaning. As a result, the amount of reaction products within the etching chamber 15a decrease. Thereafter, the lot instructed by the host computer 12 is processed without exceeding the amount of reaction products in the chamber beyond the reference value.

For example, assume that, in the host computer 12, priority orders are set based on the following three criteria: the order of lots arriving at the process to be performed by the manufacturing equipment 14 (16, 18) and coming into the waiting status (arrival order); the difference between the required delivery date and the expected completion date of the lot (permissible delay for timely delivery); and the rank of the lot, which is set only for some important lots (lot rank).

In this case, for example, the priority orders based on the lot rank is higher than the priority order set by the individual management device 20a (20b, 20c). The priority order based on the permissive delay for timely delivery is also higher than the priority order set by the individual management device, when the permissive delay is not higher than zero, i.e. no delay is permissible. The priority orders based on other criteria are lower than the priority order set by the individual management device.

That is, the selection of the lot to be processed next from the lots in waiting status is made as follows:

(1) if there are one or more lots having a rank, the lot having the highest rank is selected, (2) if there is a lot with the permissible delay for timely delivery being zero or less, the lot with the lowest permissible delay for timely delivery is selected, and (3) if there is neither a lot with a rank nor a lot with zero or minus permissible delay for timely delivery, the selection is made from the lots matching the priority order notified from the individual management device 20a (20b, 20c) of the manufacturing equipment 14 (16, 18), in accordance with the arrival order and the permissible delay for timely delivery.

Monitoring of the amount of reaction products may be directly performed using a measurement result by providing a measurement device in the etching chamber 15a. The monitoring may be indirectly performed using a record of performing the etching and cleaning, stored in the monitoring unit 22 of the individual management device 20a (20b, 20c), and the production/removal (deposition/cleaning) effect for each process and cleaning shown in Table 1.

In either case, various methods can be employed for comparing the monitored amount and the reference value, and for setting the priority order based on the result of the comparison.

If the amount of reaction products is directly monitored using the measured result, a preferred way for setting the priority order is as follows:

(1) storing, in the comparing unit 24, a value of the reaction products above which a particle generation occur as the reference value, (2) also storing, in the comparing unit 24, an amount of increase of the reaction products by performing one lot of the first process that produces and deposits the reaction product (or the process that deposits the highest amount of reaction products if three or more processes are assigned to the same etching chamber), and (3) setting the priority to the second process that removes the reaction products over the first process when the difference between the reference value and the monitored amount of reaction products becomes smaller than the amount of increase of the reaction products by the first process.

It is also possible to:

(1) store, in the comparing unit 24, a value obtained by subtracting the amount of increase of the reaction products by performing the first process from the reference value, and (2) set the priority to the second process over the first process when the monitored amount of reaction products is larger than the subtracted value.

It is also possible to set the priority order in multiple steps by storing multiple values in the comparing unit 24. That is, for example, in addition to setting the priority to the second process when the difference between the reference value and the monitored amount is small, it is also possible to set the priority to the first process when the difference is large.

Moreover, instead of setting the priority order by the setting unit 26 in the individual management device 20a (20b, 20c) based on the result of comparison by the comparing unit 24, it is also possible to notify the host computer 12 of the result of the comparison. Then, the host computer may set the priority order based on the notified comparison result. In this case, it can be considered that the setting unit of the individual management device 20a (20b, 20c) is disposed in the host computer 12 separate from the other units.

When the amount of reaction products is indirectly monitored, for example, the amount may be monitored based on the process and cleaning record following the last wet cleaning, or on the record for a predetermined number of recent lots, and the production/removal (deposition/cleaning) effects on the reaction products shown in Table 1.

If the deposition/cleaning effects of the processes are evaluated only qualitatively, as shown in Table 1, the amount of reaction products can only be monitored qualitatively. Even in this case, selecting an appropriate reference value based on actual manufacturing results enables successful management of the equipment.

That is, even if a quantitative amount of reaction products cannot be directly monitored, the amount may be monitored indirectly by using indicators such as, for examples, how many times the respective processes ranking A, B, C, and D have been performed, or how frequently the respective processes have been performed. Reference values for these indicators are determined beforehand so as to perform the comparison in the comparing unit 24. Based on the result of the comparison, the setting unit 26 then sets the priority order.

For example, light etching process (ranked B), active etching process (ranked A), and gate etching process (ranked C), as shown in Table 1, are performed within a single etching chamber of a manufacturing equipment. And the equipment can be managed with a reference value of 1:1:2 for the ratio of frequencies of these three processes. Specifically, for example, when the ratio of frequency of gate etching, that produces and deposits reaction products, reaches the reference value, the priority order is set so that the light etching and active etching, which have cleaning effects on the reaction products, are prioritized over the gate etching.

Alternately, as will be explained later, the ranks of processes may be substituted with points that represent the production/removal (deposition/cleaning) effects on the reaction products of the processes.

In general, in an automated manufacturing line for semiconductor devices, the manufacturing equipment 14 (16, 18) transmits a request for transporting wafers (lot) to the host computer 12. Then the host computer 12 selects a lot to be processed by the manufacturing equipment 14 (16, 18), and instructs the transporting devices to transport the wafers of the selected lot to the corresponding equipment. The host computer 12 also instructs the corresponding equipment to process the selected lot, thereby to manufacture semiconductor devices.

In various exemplary embodiments, this invention effectively functions by being incorporated into such a semiconductor manufacturing line.

In order to confirm the effectiveness of this embodiment, four different processes, i.e., gate etching, STI etching, light etching, and SiN sidewall etching processes, are performed within an etching chamber of the same processing equipment.

The management method of this embodiment manages manufacturing lines by utilizing the evaluation result of the deposition/cleaning effects shown in Table 1. For the utilization of the evaluation results, however, the ranks A, B, C, and D shown in Table 1 are substituted with points representing the deposition/cleaning effects on the reaction products. These points are stored in the monitoring unit 22 of the individual management device 20*a* (20*b*, 20*c*).

In various embodiments, the substitution of ranks with points is made as follows. Rank A shown in Table 1 is substituted with −2 points/lot, rank B is substituted with −1 point/lot, rank C is substituted with +2 points/lot, and rank D is substituted with +4 points/lot. As for the lot-to-lot cleaning using $SF_6$ gas, the number of points varies depending on the period of the cleaning. That is, the point of the short period (below 2 minutes) cleaning is −1 point/wafer, the medium period (5 minutes+3 minutes) cleaning is ±2 points/wafer, and the long period (above 8 minutes) cleaning is −3 points/wafer.

Thus, as shown in Table 2, corresponding points are assigned to each etching processes per lot, and to the lot-to-lot cleaning per wafer. Note that 1 lot corresponds to 24 wafers.

TABLE 2

| NAME OF STEP | NUMBER OF LOTS | NUMBER OF WAFERS | POINTS | SUM OF POINTS |
| --- | --- | --- | --- | --- |
| CONTACT LIGHT ETCHING | 19 | 456 | −1/LOT | −19 |
| GATE ETCHING | 473 | 11352 | +2/LOT | 946 |
| STI ETCHING | 32 | 768 | +4/LOT | 128 |
| SiN SIDEWALL ETCHING | 4 | 96 | −2/LOT | −8 |
| LOT-TO-LOT CLEANING (MEDIUM PERIOD) | — | 528 | −2/WAFER | −1056 |
| TOTAL | | | | −9 |

In this embodiment, a medium-period lot-to-lot cleaning is normally performed between processes of the lots. The amount of reaction products within the etching chamber 15*a* is monitored using the points of the recent 10 lots. And the priority order of the process is set based on the monitored amount, and a process to be performed next is selected.

That is, upon completion of the process of each lot, the sum of the points of the most recent 10 lots including the lot-to-lot cleaning performed therebetween, is calculated. When the sum becomes zero or larger, the setting unit 26 prioritizes the light etching and SiN sidewall etching processes, which have cleaning effects, over the gate etching and STI etching processes, which produce and deposit reaction products. The priority order, set by the setting unit 26, is notified to the host computer 12.

Subsequently, if the host computer 12 instructs processing of a lot of STI etching despite the setting of the priority to the light etching and SiN sidewall etching, an additional lot-to-lot cleaning is performed prior to processing of the STI etching lot. In reality, however, the additional lot-to-lot cleaning is combined with the normal medium-period lot-to-lot cleaning, so a long-period lot-to-lot cleaning is performed.

On the other hand, performing the medium-period lot-to-lot cleaning can reset the sum of the points by the gate etching process. Accordingly, even if processing of a gate etching lot is instructed despite setting the priority to the light etching and SiN sidewall etching, no additional lot-to-lot cleaning is performed.

Note that in each case, a dummy run using one dummy wafer is performed prior to the processing of the product wafer.

In various exemplary embodiments, each time the accumulated number of processed wafers exceeds about 500, a particle check is performed. If a number of particles of 0.2 μm or more in diameter added on a wafer is measured to be 50 or more, the process is stopped, and a wet cleaning of the etching chamber is performed.

In various exemplary embodiments, during the particle check, a wafer is transferred into the etching chamber 15*a*, the process gas for the etching is supplied, and the wafer is transferred back from the chamber. Then, the increase in the number of particles on the wafer is measured.

In various exemplary embodiments, continuous running of manufacturing equipment is performed under such management method. As shown in Table 2, 19 light etching lots, 473 gate etching lots, 32 STI etching lots, and 4 SiN sidewall etching lots are processed continuously in an etching chamber of a manufacturing equipment without performing any wet cleaning. That is, 528 lots, in total, making up 12672 wafers, or actually 13200 wafers including wafers used for lot-to-lot cleanings, were processed continuously. No particle generation was observed during the continuous running.

Moreover, the long-period lot-to-lot cleaning is never performed during the continuous running, partly because of the fact that the ratio of the lots of STI etching is small.

As a comparative embodiment, the same etching chamber of the manufacturing equipment is utilized exclusively for processing gate etching lots. Only 7000 wafers including wafers used for lot-to-lot cleanings can be processed continuously.

These results clearly indicate that the management method of this invention markedly increases the number of wafers that can be continuously processed while avoiding excessive lot-to-lot cleaning. As a result, the manufacturing capability can also be markedly improved.

Note that, according to this invention, appropriately combining different processes makes it possible to increase the number of wafers that can be processed continuously. The conditions of the processes are not changed at all. That is, gate etching and STI etching processes that produce and deposit reaction products are performed under conditions capable of obtaining an excellent processing accuracy. Accordingly, in various embodiments, the manufacturing capability can be improved while maintaining excellent processing accuracy.

According to various embodiments, the order of the processes is determined such that the sum of the points does not exceed zero, thereby enabling long-period continuous running without particle generation. In other words, the reference value for the sum of the points is set to zero. Consequently, it can be understood that, unless the sum exceeds zero, the amount of reaction products in the etching chamber can be kept within a range where the particles are not generated.

In this embodiment, however, the reference value for the sum of the points is selected with some margin. That is, exceeding the reference value does not immediately cause particle generation.

In the actual continuous running of manufacturing equipment, by slightly increasing the reference value within a range where the particles are not generated, more flexible management can be realized. For example, even if the ratio of frequency of processes that produce and deposit large amounts of reaction products, such as STI etching and the like, increases, continuous running without long-period lot-to-lot cleaning is possible, thereby making it possible to keep a high processing efficiency.

In this embodiment, a medium-period lot-to-lot cleaning is performed prior to the processing of each lot. If the sum of the points is negative, however, the medium-period lot-to-lot cleaning may be replaced by a short-period lot-to-lot cleaning. Furthermore, depending on the sum of the points and on the relationship between the preceding and following processes, the lot-to-lot cleaning may be completely omitted. Thereby, the manufacturing efficiency can be further improved.

In this embodiment, a dummy run is performed prior to the processing of each lot. Omitting the dummy run enables further improvement of the manufacturing efficiency. For example, for processes such as light etching wherein a high processing accuracy is not required, the dummy run may be omitted.

In this embodiment, the number of wafers processed per lot is fixed to 24. Also, as shown in Table 2, points per lot are fixed. However, points per lot may vary depending on the number of wafers in the lot. Thus, varying points per lot enables further precise management of the manufacturing equipment.

In this embodiment, the amount of reaction products used for the management is not directly monitored by the measurement, but is indirectly monitored based on the record of performing processes and cleanings. Of course, directly monitoring the amount of reaction products may enable management with higher accuracy.

Depending on the configuration of the equipment to be managed, however, it is sometimes impossible to measure the amount of reaction products inside the etching chamber while the equipment is used for actual manufacturing. Even if it is possible, the time period required for the measurement sometimes decreases the manufacturing capability. In such cases, it is rather preferable to manage the equipment based on indirect monitoring of the amount of reaction products.

Of course, however, the indirect monitoring may cause a relatively large error compared with the direct monitoring. Accordingly, parameters used for the indirect monitoring, such as the points for the processes, in various embodiments, are preferably adjusted periodically by comparing the indirectly monitored value with a measured value. For example, after a predetermined number of lots are processed, the individual management device 20a (20b, 20c) may receive a measured result from a measurement device equipped by the chamber 15a, and automatically adjust the parameters.

In the simplest case, for example, it is possible to compare the indirectly monitored value with the directly monitored value and, if the former is larger than the latter, make the adjustment by decreasing the points/lot assigned to the process that produces the reaction products. Further, accumulating the results of comparisons at predetermined intervals enables more reliable adjustments.

In this embodiment, the amount of reaction products inside the etching chamber is monitored, and then the priority order is set to the process to be performed next based on the monitored amount. For example, in a manufacturing line wherein the next lot is requested to the host computer 12 when the manufacturing equipment 14 (16, 18) completes the process of a lot, only the amount of reaction products at present can be monitored. However, this invention is not limited to this mode.

In a manufacturing line that selects the lot to be processed next prior to completion of current process, the amount of reaction products when the process of the next lot is completed can be predicted or indirectly monitored based on the record of previously performed processes/cleanings and the plan of the next process. Thereby, setting the priority order based on the amount of reaction products after the next lot is enabled.

Further, based on the priority order thus set, a lot to be processed next to the already selected "next lot" can be selected. Accordingly, selection of "a lot to be processed next" is not limited to the selection of a lot to be processed immediately after the completion of the current process, but includes the selection of a lot to be processed next to the already selected lots.

In the embodiment described above, the priority order for the process to be performed next is set immediately before the amount of reaction products exceeds the reference value. It is also possible, in various exemplary embodiments, to set the priority order for multiple processes to be performed in the future when the distance to the reference value becomes small.

In the manufacturing line for semiconductor devices, it is common to divide the line into multiple bays, each including a plurality of manufacturing equipment and a stocker. The stocker temporarily stocks the lots to be processed by the manufacturing equipment in the bay, and also temporarily stocks the lots that have been processed by the manufacturing equipments in the bay.

In this case, it is preferable to set priority order not only to the next process but also to future processes. The priority order set to the next process is utilized to select a lot to be processed next from the lots stocked in the stocker in the bay in which the manufacturing equipment being managed is located. In addition, the priority order for the future processes is utilized to select lots to be transported to the bay where the manufacturing equipment being managed is located. Thereby, lots of the process having higher priority are preferentially transported between the bays, and are given a waiting status in the bay where the equipment being managed is located.

Methods of managing semiconductor manufacturing equipment and systems for managing semiconductor manufacturing lines according to this invention have been described in detail. According to this invention, types of the processes to be combined, number of processes to be combined, ratios of frequencies of the processes, kinds of process gases used in the processes, and so forth, are not limited to the specific examples explained above. Various modifications may be performed without departing from the spirit and scope of this invention.

What is claimed is:

1. A method for managing semiconductor manufacturing equipment, comprising:
   selecting a first process to be performed on a semiconductor substrate in a chamber of the manufacturing equipment wherein the first process produces reaction products in the chamber;
   selecting a second process to be performed on a same or another semiconductor substrate in the chamber wherein the second process is for manufacturing the same or another semiconductor substrate, and the second process removes the reaction products in the chamber produced by the first process;
   monitoring an amount of the reaction products remaining in the chamber; and
   determining an order of performance of the first and second processes based on the monitored amount of the reaction products.

2. The method according to claim 1, wherein determining the order of performance of the first and second processes includes setting a priority order between the first and the second processes based on the monitored amount of the reaction products.

3. The method according to claim 2, wherein setting a priority order between the first and the second processes includes, depending on the monitored amount of the reaction products, one of:
   setting a priority to the second process over the first process; and
   setting a priority to the first process over the second process.

4. The method according to claim 1, wherein determining the order of performance of the first and second processes includes:
   setting a priority to the second process over the first process; and
   if the manufacturing equipment is instructed to perform the first process despite the setting of the priority to the second process over the first process, performing cleaning that removes the reaction products remaining in the chamber prior to performing the first process.

5. The method according to claim 1, wherein monitoring the amount of the reaction products is performed based on a record of performance of the first and the second processes.

6. The method according to claim 1, wherein monitoring the amount of the reaction products is performed based on a record of performance of the first and the second processes and points that represent production or removal effects of the first and the second processes.

7. The method according to claim 6, wherein monitoring the amount of the reaction products further includes:
   receiving a measurement result indicating a measured amount of the reaction products remaining in the chamber;
   comparing the monitored amount with the measured amount; and
   adjusting the points based on the result of the comparison.

8. The method according to claim 1, wherein:
   the first process is an etching process using a gas including at least one of chlorine and bromine; and
   the second process is an etching process using a gas including at least fluorine.

9. The method according to claim 8, wherein the gas including fluorine includes $SF_6$ gas.

10. The method according to claim 8, wherein the second process is an etching process of a silicon nitride film.

11. A system for managing a semiconductor manufacturing line that processes a plurality of lots of wafers, comprising:
    at least one semiconductor manufacturing station having a chamber, the manufacturing station performing a first process on a semiconductor substrate that produces reaction products within the chamber and a second process for manufacturing a same or another semiconductor substrate that removes the reaction products inside the chamber produced by the first process and, optionally, a cleaning that removes the reaction products remained within the chamber;
    a host computer that manages the manufacturing line;
    an individual managing device that manages the manufacturing station, wherein the individual managing device monitoring an amount of the reaction products remaining in the chamber, sets a priority order between the first and the second processes based on the monitored amount of the reaction products, and notifies the host computer of the set priority order,
    wherein the host computer determines an order of performing the first and the second processes based on the priority order notified from the individual managing device.

12. The system according to claim 11, wherein the host computer determines the order of performing based on the priority order notified from the individual managing device and another priority order set in the host computer.

13. The system according to claim 11, wherein:
    the individual management device sets the priority order such that the second process has a higher priority than the first process; and
    when the host computer instructs the manufacturing equipment to process a first lot that requires the first process prior to a second lot that requires the second process despite of the notification of the priority order from the individual management device, the individual managing device instructs the manufacturing equipment to perform cleaning prior to processing the first lot.

14. The system according to claim 11, wherein the individual management device monitors the amount of the reaction products remaining in the chamber based on a record of performing the first and second processes and, optionally, the cleaning.

15. The system according to claim 14, wherein the individual management device monitors the amount of the reaction products based on the record and points that represent production/removal effects of the first and second processes and, optionally, the cleaning.

16. The system according to claim 15, wherein:
the manufacturing station has a measuring device that indicates a measured amount of the reaction products in the chamber; and
the individual management device receives a measurement result indicating the measured amount of the reaction products from the measurement device, compares the monitored amount with the measured amount, and revises the points based on the result of the comparison.

17. A method for managing a semiconductor manufacturing station in a manufacturing line for processing a plurality of lots of wafers, the line including an individual management device that manages the manufacturing station, and a host computer that controls the manufacturing line, the method comprising:

selecting a first and a second process to be performed on a same or another semiconductor substrate in a chamber of a manufacturing station, the first process producing reaction products in the chamber and the second process removing the reaction products in the chamber produced by the first process, wherein the second process is for manufacturing the same or another semiconductor substrate;

monitoring, in the individual managing device, an amount of the reaction products remaining in the chamber, and setting a first priority order between the first and the second processes based on the monitored amount of the reaction products; and selecting, in the host computer, a lot to be processed next by the manufacturing station from the plurality of lots based on the first priority order and a second priority order set in the host computer.

18. The method according to claim 17, wherein:

the setting sets the first priority such that the second process has a higher priority than the first process; and the individual management device instructs the manufacturing station, when the host computer selects a first lot that requires the first process as the lot to be processed next despite of the setting of the priority order, to perform cleaning to remove the reaction products remaining in the chamber prior to processing the first lot.

* * * * *